Figure 1:
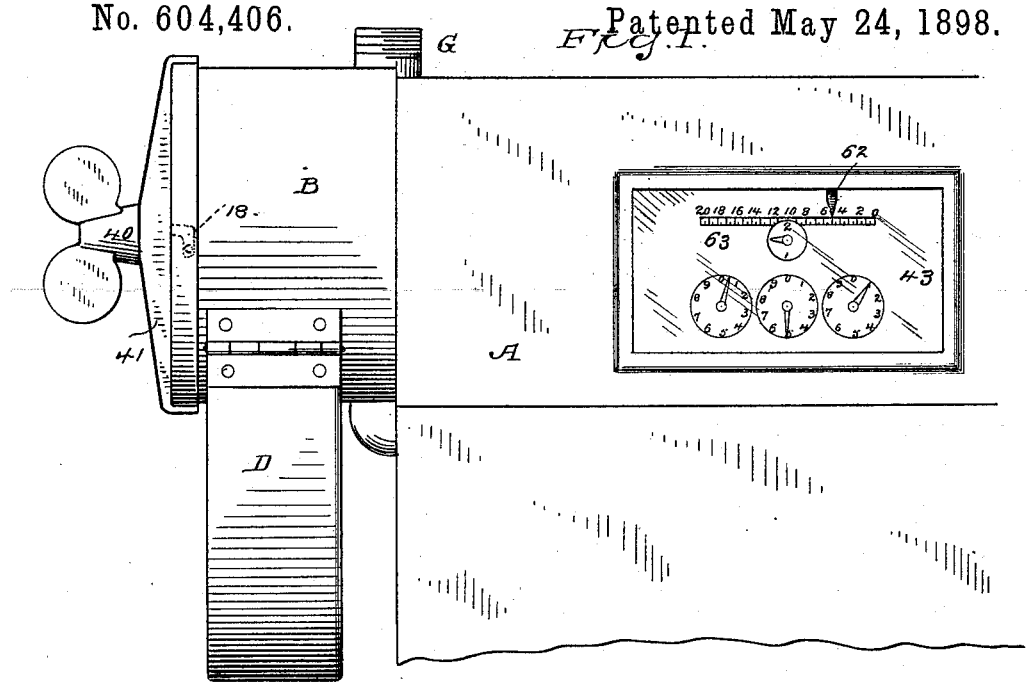

(No Model.) 4 Sheets—Sheet 1.

C. P. MAYER & J. H. POMEROY.
AUTOMATIC GAS VENDING APPARATUS.

No. 604,406. Patented May 24, 1898.

Fig. 2.ᵃ

WITNESSES
H. A. Lamb
S. V. Kiley

INVENTORS
Charles P. Mayer
John H. Pomeroy
By A. M. Wooster, atty (No Model.) 4 Sheets—Sheet 2.
C. P. MAYER & J. H. POMEROY.
AUTOMATIC GAS VENDING APPARATUS.
No. 604,406. Patented May 24, 1898.
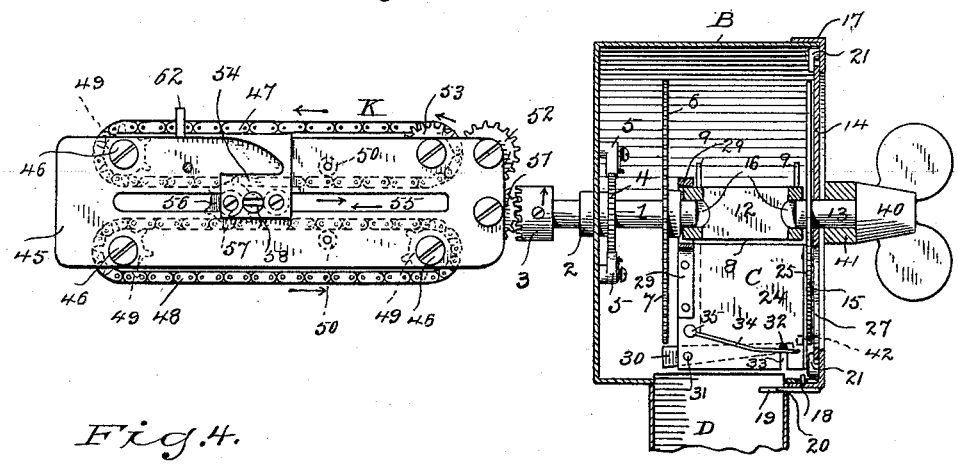
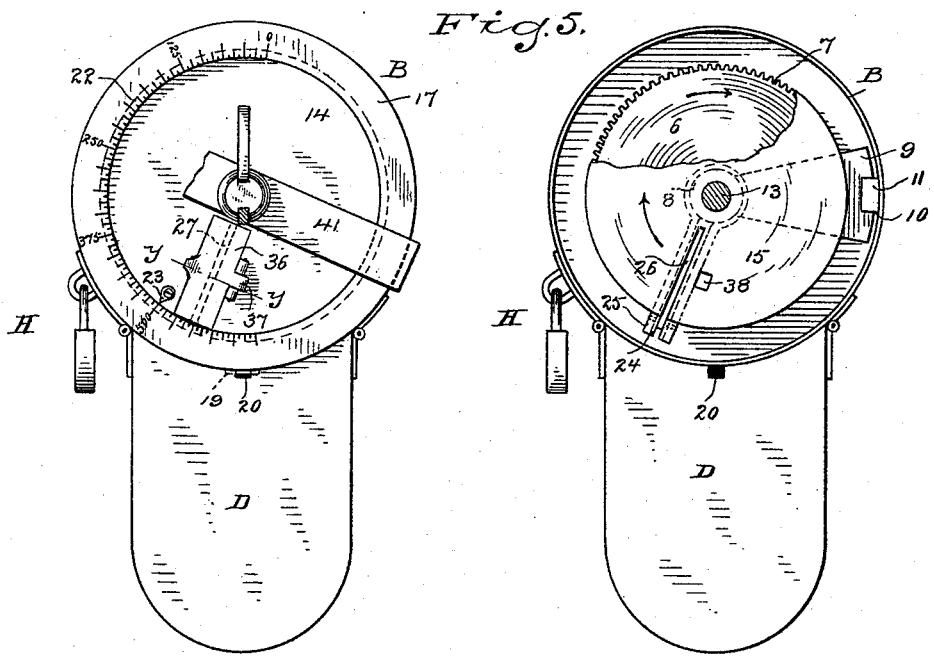
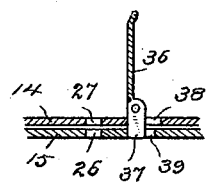
WITNESSES
H. H. Lamb
S. V. Haley
INVENTORS
Charles P. Mayer
John H. Pomeroy
By A. M. Wooster atty (No Model.) 4 Sheets—Sheet 3.
C. P. MAYER & J. H. POMEROY.
AUTOMATIC GAS VENDING APPARATUS.
No. 604,406. Patented May 24, 1898.
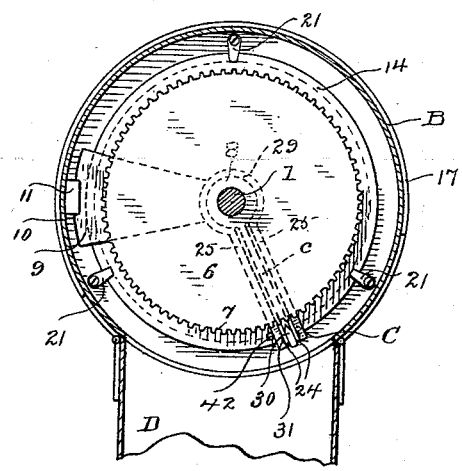
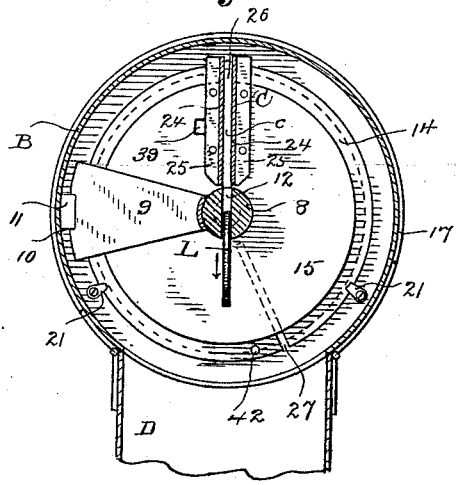
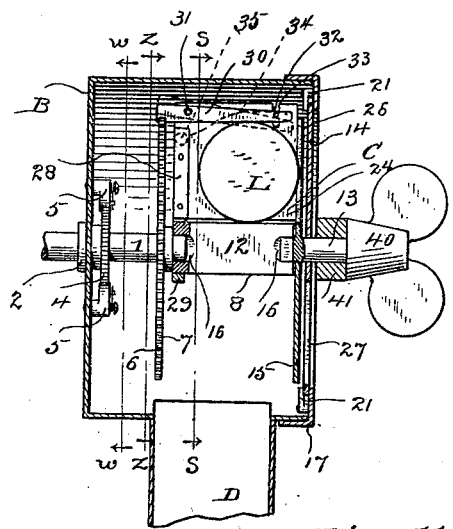
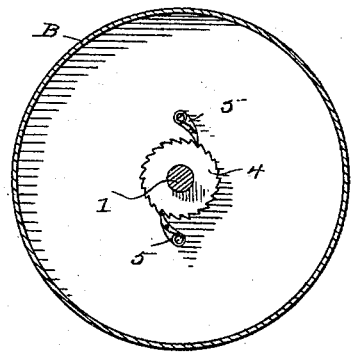
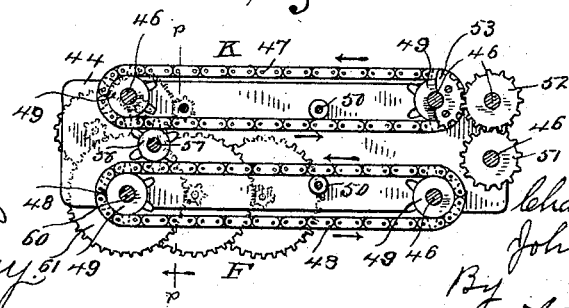
WITNESSES
H. A. Lamb
S. V. Ohley
INVENTORS
Charles P. Mayer
John H. Pomeroy
By A. M. Wooster, Atty.

(No Model.) 4 Sheets—Sheet 4.

C. P. MAYER & J. H. POMEROY.
AUTOMATIC GAS VENDING APPARATUS.

No. 604,406. Patented May 24, 1898.

WITNESSES
H. A. Lamb
S. V. Haley

INVENTORS
Charles P. Mayer and
John H. Pomeroy
By
A. M. Wooster, atty.

UNITED STATES PATENT OFFICE.

CHARLES P. MAYER AND JOHN H. POMEROY, OF NEW HAVEN, CONNECTICUT.

AUTOMATIC GAS-VENDING APPARATUS.

SPECIFICATION forming part of Letters Patent No. 604,406, dated May 24, 1898.

Application filed September 24, 1897. Serial No. 652,811. (No model.)

*To all whom it may concern:*

Be it known that we, CHARLES P. MAYER and JOHN H. POMEROY, citizens of the United States, residing at New Haven, in the county of New Haven and State of Connecticut, have invented certain new and useful Improvements in Automatic Gas-Vending Apparatus; and we do hereby declare the following to be a full, clear, and exact description of the invention, such as will enable others skilled in the art to which it appertains to make and use the same.

Our invention relates to automatic or prepayment vending apparatus for meters, more especially gas and electric vending apparatus, and has for its object to produce a device of this character which shall be simple and economical in construction and durable and efficient in accomplishing the result aimed at, the intention being to produce mechanism substantially new in principle, which shall avoid the serious defects in construction and operation which are inherent in the various coin-operated or automatic vending-machines now upon the market.

With these ends in view we have devised the simple and novel automatic vending apparatus which we will now describe, referring by reference characters to the accompanying drawings, forming part of this specification, in which—

Figure 2:
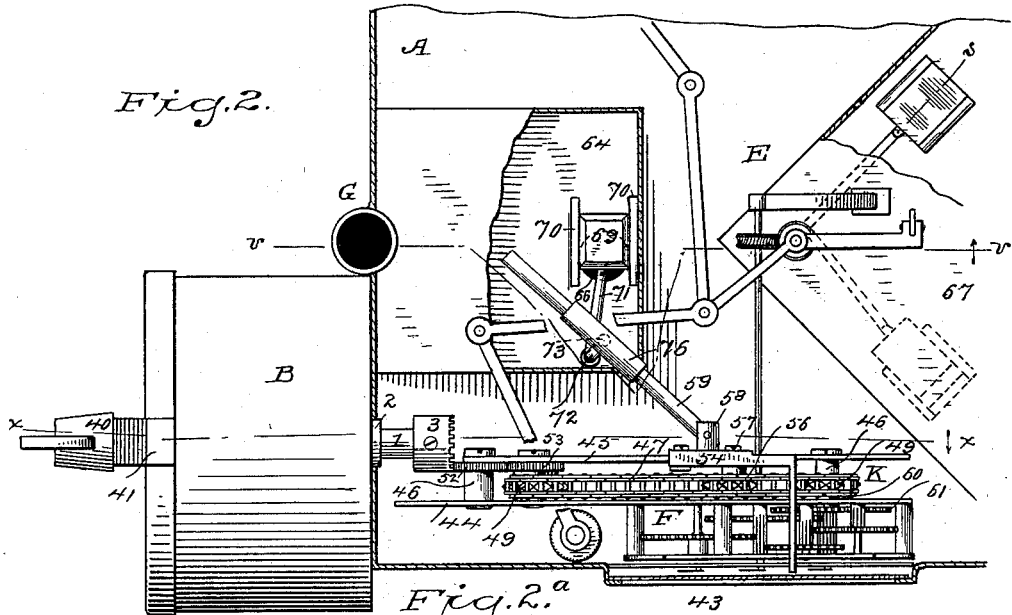
Figure 12:
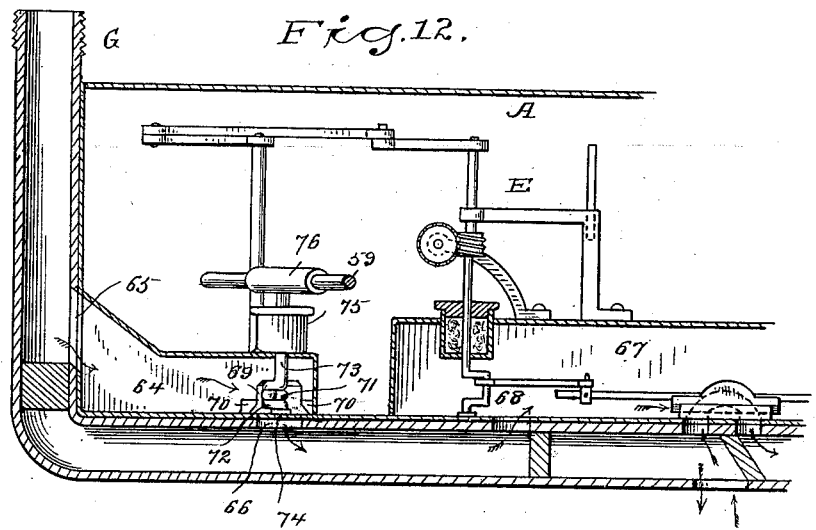
Figure 13:
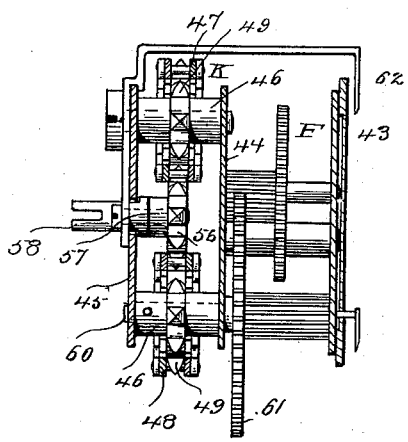

Figure 1 is a view showing the application of our novel apparatus to a gas-meter, the dial indicating that the user has paid for five hundred cubic feet of gas; Fig. 2, a plan view, the top of the meter being removed to show the meter-valve mechanism, the position of the parts corresponding to Fig. 1; Fig. 2ª, a detail view illustrating the mode in which the controlling-valve is operated; Fig. 3, a section on the line $x\,x$ in Fig. 2, the coin-receiver and controlling mechanism being in elevation and the connecting-lever being at the normal position—*i. e.*, a position in which it is not held in engagement with the notched disk on the controlling-shaft by a coin, the coin-receiver being at the receiving position; Fig. 4, a view of the coin-receiver casing and the coin-holder detached; Fig. 5, a similar view, the circular angle-plate being removed and the face-plate partly broken away; Fig. 6, an enlarged detail sectional view on the line $y\,y$ in Fig. 4, the cover or guard being raised; Fig. 7, a section on the line $z\,z$ in Fig. 9; Fig. 8, a section on the line $s\,s$ in Fig. 9, the coin having been forced from the coin-receiver; Fig. 9, a view similar to the right-hand portion of Fig. 3, but showing some of the parts in a different position, one side plate of the coin-receiver being removed and the connecting-lever held in engagement with the notched disk by a coin and acting to connect the controlling-shaft with the operating-shaft, the parts being in the position they occupy an instant before the coin is forced from the coin-receiver; Fig. 10, a section on the line $w\,w$ in Fig. 9; Fig. 11, a view of the controlling mechanism with the back plate and carrier removed and showing also the ordinary train of gearing of a gas-meter, the carrier sprocket-wheel being at the starting position—*i. e.*, a position in which the pointer indicates that no gas is due the consumer and the passage of gas through the meter is wholly cut off; Fig. 12, a section on the line $v\,v$ in Fig. 2, the valve and connecting mechanism appearing in end elevation; and Fig. 13 is an enlarged sectional view on the line $p\,p$ in Fig. 11.

A denotes the casing of a gas or other meter; B, the casing which incloses the coin-receiver; C, the coin-receiver as a whole; D, the coin-holder; E, the meter-valve mechanism as a whole; F, the ordinary train of gearing of a gas-meter, and G the ordinary gas-supply pipe.

It should be understood that our novel coin-operated controlling mechanism does not call for any special type of gas-meter, but may be readily applied to any of the various types of gas-meters now in general use. The casing which incloses the coin-receiver may be rigidly secured in any suitable manner to the end of the meter just in front of the gas-supply pipe G, as indicated in Fig. 2. The coin-holder is simply a receptacle to receive and hold the coins after they drop from the coin-receiver. The coin-holder may be hinged or otherwise attached to the under side of casing B and may be retained in the locked position by a suitable locking device H, in the present instance a hasp, staple, and padlock, although any other form of locking device may be substituted, if preferred.

K denotes mechanism within the meter-casing, which as a whole we term the "controlling" mechanism, and L denotes a coin—for example, a twenty-five-cent piece.

1 denotes the controlling-shaft, which is journaled at approximately its mid-length in a hub 2, carried by the rear wall of the casing B of the coin-receiver. This shaft extends within the meter-casing A and carries at its inner end a face-wheel 3, (see Figs. 2 and 3,) which engages the controlling mechanism, as will be more fully explained, and carries within casing B a ratchet 4, which is engaged by spring-controlled pawls 5 (see Figs. 9 and 10) to prevent backward movement of the controlling-shaft. In practice this ratchet is made with a large number of very fine teeth, so as to hold the controlling-shaft at all times against the slightest backward movement.

6 denotes a disk rigidly secured to the outer end of the controlling-shaft—i. e., the end within casing B—which is provided on its periphery with notches 7, the purpose of which will presently be explained.

8 denotes a barrel having a vertical or approximately vertical slot 12 through it and supported by arms 9, which are provided with notches 10 to receive a cross-piece 11, rigidly secured on the inner periphery of the casing B. (See Figs. 7 and 8.) The barrel is rigidly secured to the arms and is retained in operative position by the engagement of the notches with the cross-piece, this construction, however, permitting the arms, barrel, and coin-receiver to be withdrawn from the casing when required, as will be more fully explained.

13 denotes the operating-shaft, which is journaled in face-plate 14. This shaft carries just within the face-plate a plate 15, which is adapted to be connected to disk 6, thereby connecting the operating-shaft and the controlling-shaft in a manner which we shall presently describe. Barrel 8 is provided in its ends with recesses 16, which receive the ends of the controlling-shaft and the operating-shaft. It should be understood, however, that the barrel is stationary and that these shafts are wholly independent of each other except when connected for the purpose and in the manner which we shall presently describe.

17 denotes a circular angle-plate, to which the face-plate is adjustably secured and which is itself detachably secured to the side wall of casing B in any suitable manner, as by a bayonet-joint 18. (See Fig. 3 and dotted lines in Fig. 1.)

As it is necessary that the face-plate and the parts within casing B should be readily removable when required, but at the same time absolutely essential that they should be so constructed as to render it impossible for them to be removed or for any of the mechanism to be tampered with except by the proper persons, we provide a T-headed lug 19 on the angle-plate which engages a recess 20 in the front wall of the coin-holder, the body of the lug lying in the recess and the T-head lying within the coin-holder, whereby it is rendered impossible to remove the angle-piece until the coin-holder has been opened and likewise impossible to spring the wall of the coin-holder, as it is held in place by the T-head of lug 19. In practice the parts are so constructed that the pin of bayonet-joint 18 will only pass into the corresponding slot when lug 19 is out of alinement with recess 20; but when the pin and slot of the bayonet-joint are engaged and lug 19 is engaged in recess 20 the bayonet-joint will be locked and the parts must remain in this position until the coin-holder has been opened, thereby removing lug 19 from recess 20 and permitting the pin of the bayonet-joint to be moved in the slot, it being understood, of course, that the coin-holder cannot be opened by the user of the apparatus, but only by a person representing the owner. When the coin-holder is open, the angle-plate may be turned, the pin of the bayonet-joint moving in the slot, and the face-plate, angle-plate, operating-shaft, barrel, and coin-receiver may all be removed from casing B, the arms which support the barrel sliding on the cross-piece on the inner side of the casing. The face-plate is secured to the angle-piece by means of clips 21, held in place by screws.

22 denotes a scale on the angle-piece, which, in connection with a mark or pointer 23 on the face-plate, indicates to the purchaser at all times the number of feet of gas that will be furnished in return for a coin of the denomination by which the machine is operated.

In the present instance let us suppose that the coin is a quarter of a dollar and that the amount of gas furnished therefor is five hundred feet. Mark or pointer 23 on the face-plate is set at the "500 mark" on the scale and the face-plate is locked to the angle-piece in this position. Should the price of gas be changed at any time, so that more or less gas was given for a quarter of a dollar, the parts would be removed from casing B in the manner explained above, and after loosening the clip-screws the face-plate might be adjusted in either direction, as required, to indicate the new amount of gas to be furnished for a quarter of a dollar. After adjustment the face-plate is locked in position by tightening the clip-screws again, as will be more fully explained.

The coin-receiver, which as a whole we have designated by C, comprises two side plates 24, the outer ends of which are rigidly secured to plate 15, leaving a space between them. In the present instance we have shown the side plates as provided with flanges 25, which are riveted to the plate. (See Fig. 8.)

26 denotes a coin-slot in plate 15, which registers with space c between the side plates, so that a coin passed through slot 26 will lie between said side plates.

27 denotes a slot in the face-plate with which slot 26 is adapted to register, as will be more fully explained. The other ends of the side plates are held at the required distance apart by a block 28 (see Fig. 9) and are riveted to the ends of a metallic strap 29, the central portion of which incloses the barrel. (See Figs. 3 and 9.)

30 denotes a lever which we term the "connecting-lever" and which is pivoted between the side plates, as at 31. The rear or inner end of this lever is adapted to be placed in engagement with the notches of disk 6 by a coin, thereby connecting the controlling-shaft with the operating-shaft.

32 denotes a cross-pin near the outer end of lever 30, the ends of which pass through slots 33 in the side plates and are engaged by springs 34, the other ends of said springs being rigidly secured to the side plates, in the present instance to studs 35. The normal action of springs 34 is to hold the outer end of the lever inward, (see dotted lines, Fig. 3,) partially in the path of a coin passed into the coin-receiver, and to hold the inner end of said lever in a tilted or outward position, as clearly shown in Fig. 3—that is to say, a position in which said lever is out of engagement with notched disk 6.

36 denotes a cover or guard hinged to the face-plate and adapted when in the closed position to cover slot 27. This guard is provided with a rearwardly-extending lug 37, which is adapted to pass into corresponding openings 38 in the face-plate and 39 in plate 15 when slots 26 and 27 are in line with each other, but at no other time. It will be seen, therefore, that the action of this lug is to prevent the lifting of the guard except when the slots are in line with each other, as lug 37 will at other times engage the face-plate and prevent the guard from being raised, and to lock plate 15 to the face-plate while the guard is raised, so that until the guard is closed the coin-receiver cannot be moved from the receiving position, and, in fact, no portion of the mechanism can be operated at all, thereby rendering any tampering with the mechanism—for example, the removal of coins—practically impossible. Operating-shaft 13 is provided with a handpiece 40 for convenience in operation and also carries a crosspiece or bridge 41, which extends across the face of casing B and over the edge thereof, said cross-piece or bridge having its bearing on the face and side of the angle-plate, as clearly shown in Fig. 3 in connection with Fig. 1. The object of this cross-piece is to brace and strengthen the casing and render it practically impossible for any one to spring the face-plate of the casing, or to tamper in any way with either the coin-receiving or the controlling mechanism.

It will of course be understood that the mechanism indicated by K, which we term as a whole the "controlling" mechanism and which will presently be described in full, is itself actuated by controlling-shaft 1.

The operation of connecting the controlling-shaft with the operating-shaft and of manipulating the controlling-shaft is as follows: The operator by means of handpiece 40 turns the operating-shaft until slots 27 and 26 in the face-plate and plate 15, respectively, are in line with each other. In practice we preferably provide a pin or lug 42 on the inner side of the face-plate, which is engaged by the flange 25 of one of the side plates and serves as a stop for the coin-receiver at the instant slots 27 and 26 are in line with each other. As already stated, openings 38 and 39 will also be in line with each other, so that guard 36 may be raised, lug 37 passing into said openings. The operator passes a coin, in the present instance a quarter of a dollar, through slots 27 and 26 and into space c in the coin-receiver, the coin as it is passed into the coin-receiver acting to tilt the forward end of lever 30 and place the inner or rear end of said lever in engagement with the notches in the periphery of disk 6, thereby connecting the controlling-shaft with the operating-shaft. It should be noted that this lifting of lever 30 is against the power of springs 34, said springs acting to hold the edge of the coin against barrel 8. The operator by means of the handpiece may now turn the operating-shaft and with it the controlling-shaft, it being understood, of course, that these two shafts are now connected together by means of lever 30, the coin-receiver, and the coin, the coin-receiver being rigidly secured to plate 15, which is itself rigidly secured to the operating-shaft, and the coin acting to retain the connecting-lever carried by the coin-receiver in engagement with disk 6, carried by the controlling-shaft. The position of the parts before the insertion of the coin is clearly illustrated in Fig. 3, and the position of the parts after the coin has been placed in the coin-receiver and until it is expelled therefrom is clearly shown in Fig. 9. As already stated, barrel 8 is provided with a vertical or approximately vertical slot 12. As soon as the coin-receiver, with the coin therein, has reached the position shown in Fig. 9—that is, a position in which the space c in the coin-receiver registers with the slot 12 in the barrel—springs 34 will act to throw lever 30 from the position shown in full lines in Fig. 9 to the position shown in dotted lines in said figure, and will instantly expel the coin from the coin-receiver and project it through slot 12 in the barrel into the coin-holder, Fig. 8 showing the position of the parts at the instant the coin is passing through slot 12. The instant the coin begins to move downward toward the coin-receiver lever 30 will be disengaged from disk 6 on the controlling-shaft, and the latter will thereby become disconnected from the operating-shaft, so that any additional movement of the operating-shaft in either direction will have no effect whatever on the controlling-shaft and the controlling mechanism. The only way in which the controlling-shaft can be again actuated is by returning the coin-receiver to the receiving position—i. e., a position in which slots 26 and 27 are in alinement—and inserting another coin in the manner already described, it being, as already stated, impossible to raise the guard from slot 27 until the coin-receiver is in the receiving position and it being impossible to move the coin-receiver from this position (the parts being locked therein by the engagement of lug 37 with openings 38 and 39) until the guard is closed down over the slot. It should be borne in mind that barrel 8 is always stationary and that each time a coin is placed in the coin-receiver and the latter is operated the movement of the coin-receiver will be from the starting position to the position at which space c in the coin-receiver registers with slot 12 and permits the coin to be expelled, and, furthermore, that each movement of the controlling-shaft must correspond exactly with the movement of the coin-receiver. It follows, therefore, that the adjustment of the face-plate, which determines the backward movement of the coin-receiver—i. e., the movement to the receiving position—is what determines the amount of gas allowed for each coin. For example, suppose that mark "23" upon the face-plate registered with numeral "375" in scale 22. It is obvious that the position of coin-slots 27 and 26 and incidentally of lug 42 would have been shifted upward from the position in Figs. 7 and 8 (which correspond with Fig. 4) nearer to the expelling position, (shown in Fig. 8,) thereby lessening the oscillation of the coin-receiver, and consequently the movement of the controlling-shaft at each actuation, and reducing to a proportionate extent the amount of gas allowed for each coin.

We will now describe the mechanism within the meter-case, which we have designated as a whole by K and have termed the "controlling mechanism." This mechanism connects with and is actuated by face-wheel 3 on the controlling-shaft and opens the valve which determines the amount of gas that can pass from gas-supply pipe G into the meter.

43 denotes the usual front or dial plate, belonging to meter-train F; 44, the back plate of the meter-train, which in this instance is elongated and serves, additionally, as the front plate of the controlling mechanism, and 45 is the back plate of the controlling mechanism. Plates 44 and 45 are held in proper position relative to each other by studs 46 or in any manner suitable to mechanism of this character.

47 and 48 denote sprocket-chains which are adapted to travel on sprocket-wheels 49, mounted on studs 46. These chains are in practice so constructed that the openings therein will just receive the teeth of the sprocket-wheels, so that there will be no lost motion between sprocket wheels and chains.

50 denotes rollers between plates 44 and 45, which support the sprocket-chains and prevent sagging.

51 denotes a gear-wheel journaled on a stud 46, which meshes with face-wheel 3 on the controlling-shaft, and 52 denotes a similar gear-wheel which meshes with gear-wheel 51 and also with a gear-wheel 53, which is rigidly secured to one of the sprocket-wheels carrying sprocket-chain 47.

54 is a carrier which is adapted to move upon plate 45. In the present instance we have shown the carrier as adapted to reciprocate in a slot 55 in said plate.

56 denotes a sprocket-wheel mounted on a stud 57, extending inward from the carrier. This sprocket-wheel lies between sprocket-chains 47 and 48 and engages both chains, as is clearly shown in Figs. 11 and 13.

58 denotes a stud extending outward from the carrier, to which the controlling-lever 59 is pivoted. (See Fig. 2.)

The only element in meter-train F which needs to be specially referred to is shaft 60, which carries the thousands-wheel 61. This shaft extends through plates 43, 44, and 45 and, in addition to the thousands-wheel, carries one of the sprocket-wheels 49, which carry sprocket-chain 48.

62 denotes a pointer which extends upward from the carrier and forward over the meter-train, the outer end thereof extending downward over the front plate 43 of the meter, (see Fig. 1,) where it indicates at all times the amount of gas to which the consumer is entitled, as will be more fully explained.

In Figs. 1 and 12 we have illustrated portions of the meter-valve mechanism, said mechanism as a whole being indicated by E. Instead of the gas passing through gas-supply pipe G to the meter-valve mechanism E in the usual manner we provide a chamber 64 within the meter, which for convenience in description we will term the "receiving-chamber." The gas enters chamber 64 at opening 65 and passes from said chamber at opening 66. In the present instance we have shown openings 66 as leading into the supply-pipe, from whence the gas passes into valve-chamber 67 of the meter at opening 68. This portion of the construction is not of the essence of our invention, as so far as our invention is concerned the special mode in which the gas passes from receiving-chamber 64 to the valve-chamber of the meter is wholly immaterial, the essential feature being that gas enters the receiving-chamber freely from the supply-pipe and that the passage of gas from the receiving-chamber to the meter at opening 66 is controlled by a valve 69 within the receiving-chamber, which is itself operated by controlling-lever 59. Valve 69 is shown as adapted to slide in ways 70.

71 denotes the valve-rod, one end of which is pivoted to the valve itself and the other to a crank 72 in a shaft 73, one end of which is shown as journaled in a block 74, the outer end passing upward through a stuffing-box 75 and carrying at its upper end a sleeve 76, through which controlling-lever 59 passes freely. It will thus be seen that the forward and backward movements of carrier 54 will cause controlling-lever 59 to reciprocate in sleeve 76 and will oscillate said sleeve and with it shaft 73, to which it is rigidly secured. The oscillation of the crank in shaft 73 reciprocates the valve-rod, and thus opens or closes valve 69, as may be. The greater the movement of the carrier, as when two or more quarter-dollars are placed in the coin-receiver and the controlling mechanism actuated as described, the farther the valve will be opened, each movement of the valve toward the open position permitting the passage of an additional five hundred feet of gas, as will be more fully explained.

Having explained above the operation of connecting the controlling-shaft with the operating-shaft and of operating the controlling-shaft by means of the operating-shaft, we will now describe the operation of the controlling mechanism, which as a whole we have designated by K and which is operated by the controlling-shaft. As stated above, we will suppose that a quarter of a dollar is the coin by which the mechanism is operated and that five hundred feet is the quantity of gas furnished for each quarter of a dollar. Let us suppose, furthermore, that before the controlling-shaft was manipulated as described above sprocket-wheel 56 upon the carrier stood at the position shown in Fig. 11 and pointer 62 stood at zero on scale 63 on the front plate of the meter. When the operator, after placing a coin in the coin-receiver, thereby tilting the connecting-lever and connecting the controlling-shaft with the operating-shaft, turns the controlling-shaft by means of handpiece 40, the action upon the controlling mechanism through face-wheel 3 and gear-wheels 51, 52, and 53 is as follows: As one of the sprocket-wheels 49, which carries chain 47, is rigidly secured to gear-wheel 53, it follows that said sprocket-wheel will receive rotary motion and will move sprocket-chain 47 in the direction of the arrow in Fig. 11. As sprocket-chain 48 remains stationary, it follows that sprocket-wheel 56 upon the carrier (see Fig. 3 in connection with Fig. 11) will be rotated and will travel from the position shown in Fig. 11 to the position in Figs. 2 and 3 and will move the carrier a corresponding distance. This movement of the carrier places pointer 62 in position to indicate on scale 63 the amount of gas due the user, in the present instance five hundred feet, as indicated in Fig. 1.

Having inserted a coin in the coin-receiver and manipulated the controlling mechanism in the manner described, the user may repeat the operation within the capacity of the apparatus, and for each quarter of a dollar that he puts in the coin-holder will be allowed an additional five hundred feet of gas, which will be indicated by pointer 62 on the scale. With the scale illustrated in Fig. 1 the controlling mechanism may be manipulated four times, which will allow to the user two thousand feet of gas. The capacity of the apparatus, however, and the coin by which it is to be operated are matters wholly within the province of the manufacturer and will be determined by the requirements of the trade.

It should be understood that it is not necessary to wait until all of the gas to which the user is entitled has been consumed before putting in another coin and again manipulating the apparatus, and, furthermore, that the ordinary registering mechanism of the meter operates in the usual manner simultaneously with the operation of our novel vending apparatus, so that the user may ascertain at any time how fast gas is being consumed and to how much he is still entitled. For example, suppose that the user has placed four quarter-dollars in the coin-holder and has manipulated the controlling mechanism four times. Pointer 62 will now indicate on the dial that the user is entitled to two thousand feet of gas and will move backward toward the starting-point as the gas is consumed, the ordinary registering mechanism of the meter operating as usual and registering the consumption of gas as it takes place. As already stated, the only connection between the meter-train and the controlling mechanism is by means of shaft 60, which carries the thousands-wheel and also carries one of the sprocket-wheels, which carries sprocket-chain 48. It must of course be understood that the meter-train is actuated in the usual manner by the meter-valve mechanism, which we have indicated by E, the pointers upon the shafts of the meter-train acting in the usual way to register the number of feet of gas passing through the meter as determined by the operation of the meter-valve mechanism. It will be obvious, therefore, that as the gas to which the user is entitled passes through the meter the meter-valve mechanism and the meter-train will register it and by means of shaft 60 of the thousands-wheel will act upon the controlling mechanism in a manner which we will now describe. When gas to which the user is entitled is being consumed, the operation of the controlling mechanism is just the reverse of what takes place when the controlling-shaft is operated by the handpiece after placing a coin in the coin-receiver. In the first instance sprocket-chain 48 remains stationary and sprocket-chain 47 is operated by the controlling mechanism, which moves carrier sprocket-wheel 56, and with it, of course, the carrier and pointer 62, in the direction of the arrows in Figs. 3 and 11. When gas is being consumed, however, just the reverse takes place. Sprocket-chain 47 remains stationary, and sprocket-chain 48 is moved in the direction of the arrows in Figs.

3 and 11, and the carrier is moved toward the left, as seen in these views—that is to say, from any position to which it has been moved by manipulation of the controlling mechanism—for example, the position in Fig. 3—toward the position in which the carrier sprocket-wheel is shown in Fig. 11—so that when the entire amount of gas to which the user is entitled has been consumed not only will the amount have been registered in the usual manner by the meter-valve mechanism, in connection with the meter-train, but pointer 62 will have moved back to zero on scale 63. Sprocket-chains 47 and 48 move alternately, never simultaneously, sprocket-chain 47 acting to move the carrier and pointer toward the right, as seen in Fig. 3, when the controlling mechanism is operated, sprocket-chain 48 remaining stationary, and sprocket-chain 48 acting to return the carrier and pointer to the starting position while gas is passing through the meter, sprocket-chain 47 meanwhile remaining stationary.

The supply and cut-off of the gas, which is sold and delivered to the user upon each payment of a coin and manipulation of the controlling mechanism, are effected by movement of valve 69 in the receiving-chamber toward or from its fully-opened position, said valve being partly opened in the manner described each time a coin is placed in the coin-receiver and the controlling mechanism is operated and being moved backward toward the closed position as gas is consumed by the meter-valve mechanism through the controlling mechanism. In the present instance we have shown the controlling mechanism as connected to the shaft of the thousand-wheel—that is to say, the shaft which makes one revolution while one thousand feet of gas are passing through the meter. Valve 69 is so adjusted with relation to the meter-valve mechanism that each time the controlling mechanism is operated the valve will be opened just the distance which it will move backward (so as to wholly close opening 66) while the meter-valve mechanism and meter-train are measuring and registering the passage of the amount of gas furnished for the coin or coins placed in the coin-receiver—in the present instance five hundred feet for each coin. It makes no difference whether the gas sold and delivered to the user is consumed slowly or rapidly, as the closing of valve 69 is controlled solely by the meter-valve mechanism, so that until the predetermined amount of gas—in the present instance five hundred feet—has passed through the meter and been measured and registered by the meter-valve mechanism and meter-train valve 69 will still permit the passage of gas through the receiving-chamber into the valve-chamber of the meter. The instant, however, that the meter-valve mechanism and meter-train have measured and registered the passage of five hundred feet of gas valve 69 will have moved backward far enough to wholly close opening 66, and thus cut off the passage of gas from the receiving-chamber into the valve-chamber of the meter. The principle is just the same if the controlling mechanism is actuated a second or third time to furnish a second or third five hundred feet of gas to the user. Valve 69 will in each instance be opened just far enough so that it will not be closed until the meter-valve mechanism and the meter-train shall have measured and registered the passage of the amount of gas to which the user is entitled. The instant this has taken place, however, valve 69 will cut off the passage of gas through the receiving-chamber into the valve-chamber of the meter, so that no more gas can pass through the meter until the controlling mechanism shall have been operated to move the carrier and open valve 69, which can only take place when a coin shall have been placed in the coin-receiver and the controlling-shaft placed in connection with the operating-shaft by means of the connecting-lever and the coin in the coin-receiver. It is an especially important feature of our invention that there is no lost motion in connection with the measuring and delivering of gas to the consumer under any circumstances. This is owing to the fact that the pressure of the sprocket-wheels upon the sprocket-chains, and vice versa, is always at one point of contact. For example, while the controlling mechanism is being operated by the handpiece, after a coin has been placed in the coin-receiver and sprocket-chain 47 is moving the carrier, sprocket-chain 48 remaining stationary, the pressure of sprocket-chain 47 will be upon the left side of the upper teeth of carrier sprocket-wheel 56, as seen in Fig. 11, and the right side of the lower teeth of the carrier sprocket-wheel will press against sprocket-chain 48. When gas is being consumed, the movement is reversed, but the pressure is applied at precisely the same points. Sprocket-chain 48 will move and will press against the right side of the lower teeth of carrier sprocket-wheel 56, and the left side of the upper teeth of said carrier sprocket-wheel will press against sprocket-chain 47, which remains stationary. There is no instant at which there is any letting up or relieving of the contact of the parts, and consequently no lost motion to cause irregularity in the measuring of gas to the consumer, the amount of gas sold and delivered to the consumer for a coin or coins being a fixed amount for each coin, of which amount the user is informed by mark 23, in connection with scale 22 on the face-plate, the accuracy with which such amount of gas is measured being guaranteed to him by the meter-valve mechanism and meter-train. Another important feature of our invention is that full provision is made for changes in the price of gas, which would of course require that a greater or less quantity of gas be allowed to the consumer for each coin placed in the coin-receiver, followed by an actuation of the controlling-shaft. For example, a statute in one State requires that the price of gas be reduced five cents per thousand feet each year for five years. This would require an adjustment every year at the time the change in price took effect, increasing the amount of gas allowed for each coin. This adjustment could be made at any time without regard to the position of the controlling and meter-valve mechanisms. The operator would simply remove the angle-plate, face-plate 14, and the parts within casing B in the manner described. Then loosen clips 21 and turn face-plate 14 until mark or pointer 23 registered with the numeral in scale 22, indicating the number of feet of gas which the gas company would allow to the consumer for each coin. If more gas was to be allowed, mark or pointer 23 would be moved downward from the position shown in Fig. 4, which would, as has been fully explained, increase the movement of the coin-receiver, and consequently of the controlling-shaft, at each actuation and would open valve 69 to a greater distance, so that more gas could pass through before it was closed again through the operation of the meter-valve mechanism and the meter-train. If less gas was to be allowed, mark or pointer 23 would be moved upward from the position shown in Fig. 4, which would proportionately lessen the movement of the coin-receiver, and consequently of the controlling-shaft, so that valve 69 would be opened a less distance and less gas could pass through before it was closed again through the operation of the meter-valve mechanism and the meter-train.

We have found in practice that owing to the accuracy of movement of the parts and the fact that there is no lost motion under any circumstances we are able by adjustment of the face-plate to regulate the amount of gas allowed to the user for each coin within a fraction of a cubic foot.

Having thus described our invention, we claim—

1. In a device of the character described, the combination with a controlling-shaft carrying a notched disk and an operating-shaft carrying a coin-receiver, of a single connecting-lever carried by the coin-receiver and adapted to be tilted by the insertion of a coin one end of said lever being formed to directly engage the notched disk thereby connecting the shafts.

2. In a device of the character described, the combination with a controlling-shaft carrying a notched disk, an operating-shaft and a fixed barrel in which the inner ends of said shafts are journaled and which is provided with a vertical slot, of a coin-receiver carried by the operating-shaft and oscillating upon the barrel, a connecting-lever carried by the coin-receiver which is tilted by the insertion of a coin and caused to engage the notched disk, and a spring acting on the connecting-lever to normally retain said lever out of engagement with the notched disk and after a coin has been inserted to expel the coin through the slot in the barrel when the coin-receiver registers with said slot.

3. In a device of the character described, the combination with the notched disk and the coin-receiver, of a single connecting-lever pivoted in the coin-receiver one end of said lever being extended to directly engage the notched disk, and a spring normally acting to hold the said end of the connecting-lever out of engagement with the notched disk.

4. In a device of the character described, the combination with the notched disk and the barrel having a slot, of the coin-receiver, a single connecting-lever pivoted therein and adapted to have one end placed directly in engagement with the disk by a coin, and a spring acting to hold the coin pressed against the barrel and when the coin-receiver is in alinement with the slot to expel the coin through the slot.

5. The stationary or fixed barrel 8 having recesses 16 and slot 12, in combination with a coin-receiver movable about said barrel and adapted to discharge a coin through said slot, substantially as shown, for the purpose specified.

6. In a device of the character described, the combination with a case and a barrel having a slot 12, of arms 9 rigidly secured thereto and means for detachably securing said arms in the case.

7. In a device of the character described, the combination with casing B having a cross-piece 11 rigidly secured to its inner periphery, of a barrel 8 having arms rigidly secured thereto said arms being provided with notches 10 which receive the cross-piece thereby holding the barrel in position and permitting its convenient removal.

8. In a device of the character described, the combination with casing B and a circular angle-plate 17 detachably secured thereto and provided with a T-headed lug 19, of coin-holder D having a recess 20 adapted to receive the lug with the head thereof extending each side of the recess 20 and inside the holder D and means for attaching the coin-holder to casing B so that the angle-plate cannot be removed until the coin-holder is opened.

9. In a device of the character described, the combination with casing B and the circular angle-plate detachably secured thereto, of the face-plate rotatably adjustable relatively to the angle-plate, substantially as shown, for the purpose set forth.

10. In a device of the character described, the combination with the circular angle-plate having a scale 22, of the face-plate rotatably adjustable relatively to the angle-plate and provided with a mark adapted to register with the scale, substantially as described, for the purpose set forth.

11. In a device of the character described, the combination with the angle-plate and the face-plate detachably secured thereto, of the operating-shaft journaled in the face-plate and carrying a bridge 41 which bears on the angle-plate.

12. In a device of the character described, the combination with the face-plate having a radial coin-slot and an operating-shaft journaled in said plate and carrying a plate 15 having a radial coin-slot, of a stationary or fixed barrel having a coin-passage, a coin-receiver secured to plate 15 and having a space c registering with the coin-slot in plate 15, and means for stopping the rotation of the controlling-shaft and the coin-receiver when the coin-slots are in alinement.

13. In a device of the character described, the combination with the controlling-shaft and the barrel, of a coin-receiver, comprising plates 24, secured to the operating-shaft and turning on the barrel, said plates having slots 33, connecting-lever 30 pivoted between said plates and having a cross-pin engaging the slots, and a spring bearing upon the cross-pin.

14. In a device of the character described, the combination with the face-plate, an operating-shaft journaled therein and carrying a plate 15, said plates having radial coin-slots, and the central barrel having a vertical slot, of the coin-receiver secured to plate 15 and having a space c registering with the coin-slot in said plate, mechanism for stopping the rotation of the coin-receiver when the coin-slots are in alinement and a spring-actuated lever acting to expel the coin through the slot in the barrel when the coin-receiver is placed in alinement therewith.

15. In a device of the character described, the combination with the carrier and a sprocket-wheel 56 thereon, of two sprocket-chains which are engaged by said sprocket-wheel, the controlling-shaft and mechanism intermediate the controlling-shaft and one of the sprocket-chains whereby said sprocket-chain is actuated to move the carrier in one direction, the other sprocket-chain remaining stationary.

16. In a device of the character described, the combination with the carrier and a sprocket-wheel 56 thereon, of sprocket-chains 47 and 48 both of which are engaged by sprocket-wheel 56, sprocket-wheels 49 on which said chains are mounted, the controlling-shaft and mechanism intermediate the controlling-shaft and one of the sprocket-wheels 49 by which sprocket-chain 47 is actuated and the carrier is moved in one direction sprocket-chain 48 remaining stationary.

17. In a device of the character described, the combination with the carrier and a sprocket-wheel 56 thereon, of two sprocket-chains which are engaged by said sprocket-wheel, sprocket-wheels 49 on which said chains are mounted, the controlling-shaft having a face-wheel and gear-wheels intermediate said face-wheel and one of the sprocket-wheels 49 so that when the controlling-shaft is actuated the carrier will be moved in one direction by one of the sprocket-chains, the other sprocket-chain remaining stationary.

18. In a gas-vending machine the carrier 54 having sprocket-wheel 56 mounted thereon, and the valve-controlling lever 59 pivotally connected with the carrier, substantially as shown, for the purpose set forth.

19. In a device of the character described, the combination with sprocket-chains 47 and 48 and the carrier mounted to reciprocate between said chains and having a sprocket-wheel engaging both of said chains, of mechanism for actuating said chains alternately whereby the carrier is moved in opposite directions.

20. In a device of the character described, the combination with sprocket-chains 47 and 48, sprocket-wheels 49 on which said chains are mounted, and the carrier mounted to reciprocate between said chains and having a sprocket-wheel 56 engaging both of said chains, of a meter-train F having a shaft 60 carrying one of the sprocket-wheels 49, whereby one of said chains will be actuated by the meter-train and will move the carrier in one direction.

21. In a device of the character described, the combination with sprocket-chains 47 and 48, sprocket-wheels 49 on which said chains are mounted and a carrier having a sprocket-wheel 56 engaging both of said chains, of the controlling-shaft and mechanism intermediate said controlling-shaft and one of the sprocket-wheels 49 by which one of the sprocket-chains is actuated and the carrier is moved in one direction, and meter-train F having shaft 60 carrying one of the sprocket-wheels 49 on which the other chain is mounted, whereby the other chain is actuated through the meter-train and the carrier is moved in the opposite direction.

22. In a device of the character described, the combination with the carrier having a sprocket-wheel 56, and sprocket-chains 47 and 48 engaging said sprocket-wheel, of the controlling-shaft and mechanism intermediate the controlling-shaft and chain 47 whereby said chain is actuated to move the carrier in one direction, substantially as shown, for the purpose specified.

23. In a device of the character described, the combination with the carrier having a sprocket-wheel 56 and sprocket-chains 47 and 48 engaged by said sprocket-wheel, of a meter-train F having a shaft 60 and mechanism intermediate said shaft and sprocket-chain 48 whereby said chain is actuated to move the carrier in one direction.

24. In a device of the character described, the combination with sprocket-chains 47 and 48 and the carrier having a sprocket-wheel 56 engaging both of said sprocket-chains and having a pointer extending therefrom, of mechanism for actuating said chains alternately, whereby the carrier may be moved in opposite directions.

25. In a device of the character described, the combination with the receiving-chamber and valve 69 which controls the passage of gas therefrom, of meter-valve mechanism, a meter-train, a controlling-shaft, carrier 54 having a sprocket-wheel 56, sprocket-chains 47 and 48, both of which are engaged by said sprocket-wheel, mechanism intermediate said chains and the controlling-shaft and the meter-train respectively for actuating said chains alternately, and mechanism intermediate the carrier and valve 69 whereby said valve is opened and closed.

26. In a device of the character described, the combination with the carrier, controlling-lever 59 and valve 69, of shaft 73 having a crank 72 and carrying at its upper end a sleeve through which the controlling-lever passes freely and a valve-rod 71 the ends of which are pivoted respectively to the valve and to the crank, movement of the carrier and the controlling-lever acting to oscillate the sleeve, shaft and crank thereby opening or closing the valve.

27. In a device of the character described, the combination with meter-valve mechanism a meter train and valve 69, of the sprocket-chains, the carrier having a sprocket-wheel engaging said chains, and mechanism intermediate the carrier and the valve whereby the meter-train will move the valve in one direction.

28. In a device of the character described, the combination with the controlling-shaft and valve 69, of the sprocket-chains, the carrier having a sprocket-wheel engaging said chains, mechanism intermediate the controlling-shaft and the chains whereby one of said chains is operated, and mechanism intermediate the carrier and the valve whereby the latter is moved in one direction by movement of the controlling-shaft.

29. In a device of the character described, the combination with valve 69, sprocket-chains 47 and 48, the carrier having a sprocket-wheel engaging both of said chains and connecting mechanism intermediate the carrier and the valve, of a controlling-shaft and mechanism intermediate the controlling-shaft and sprocket-chain 47 whereby valve 69 is opened, and meter-valve mechanism, a meter-train and mechanism intermediate the meter-train and sprocket-chain 48 whereby the valve is closed.

30. In a device of the character described, the combination with valve 69, the sprocket-chains, the carrier having a sprocket-wheel engaging both of said chains and connecting mechanism intermediate the carrier and the valve, of the controlling-shaft, mechanism intermediate the controlling-shaft and one of the chains whereby the valve is opened, the operating-shaft a coin-receiver carried thereby coin-operated mechanism for connecting the coin-receiver with the controlling-shaft and means for varying the receiving position of the coin-receiver so that the movement of the coin-receiver and the controlling-shaft may be increased or decreased thereby increasing or decreasing the movement of the valve in opening, and determining the amount of gas that can pass said valve.

31. In a device of the character described, the combination with valve 69, the carrier having a sprocket-wheel 56, and mechanism intermediate the carrier and the valve whereby the latter is opened and closed, of sprocket-chains 47 and 48 engaged by said sprocket-wheel, a controlling-shaft acting upon one of said chains to open the valve, and meter-valve mechanism and meter-train acting upon the other chain to close the valve.

32. In a device of the character described, the combination with valve 69, the carrier having sprocket-wheel 56, and mechanism intermediate the carrier and the valve whereby the latter is opened and closed, of sprocket-chains 47 and 48 engaged by said sprocket-wheel, a controlling-shaft acting upon one of said chains to open the valve and means for regulating the movement of the controlling-shaft so that the valve will be opened more or less to permit the passage of a greater or less quantity of gas.

33. In a device of the character described, the combination with valve 69, the sprocket-chains, the carrier and connecting mechanism intermediate the carrier and the valve, of the controlling-shaft, by which one of the said chains is actuated to open the valve.

34. In a device of the character described, the combination with valve 69, the sprocket-chains, the carrier and connecting mechanism intermediate the carrier and the valve, of meter-valve mechanism and a meter-train whereby one of said chains is actuated to close the valve.

35. In a device of the character described, the combination with valve 69, the sprocket-chains, the carrier, and connecting mechanism intermediate the carrier and the valve, of a controlling-shaft whereby one of said chains is actuated to open said valve and meter-valve mechanism and a meter-train whereby the other chain is actuated to close the valve.

36. In a device of the character described, the combination with valve 69, the sprocket-chains, the carrier and connecting mechanism intermediate the carrier and the valve, of a controlling-shaft by which one of said chains is actuated to open the valve, a coin-receiver, coin-operated means for connecting the coin-receiver and the controlling-shaft, and means for regulating the movement of the coin-receiver and consequently of the valve.

37. In a device of the character described, the combination with the carrier and the sprocket-chains, of the controlling-shaft by which one of said chains is actuated to move the carrier in one direction, the coin-receiver, coin-operated means for connecting the coin-receiver and the controlling-shaft, a face-plate having a coin-slot and a lug which is engaged by the coin-receiver when the coin-receiver and the slot are in alinement, and means for adjusting the face-plate whereby the movement of the coin-receiver and the controlling-shaft is determined.

38. In a device of the character described, the combination with the carrier and the sprocket-chains, of a controlling-shaft by which one of said chains is actuated to move the carrier in one direction, a coin-receiver, a connecting-lever which is tilted by the insertion of a coin to connect the coin-receiver and the controlling-shaft, a fixed barrel about which the coin-receiver oscillates and which is provided with a vertical slot through which the coin is expelled when the coin-receiver and the slot are in alinement, a face-plate having a coin-slot and a lug which is engaged by the coin-receiver when the coin-receiver and coin-slot are in alinement, and means for adjusting the face-plate and thereby regulating the receiving position of the coin-receiver and consequently determining the movement of the coin-receiver and the controlling-shaft.

39. In a device of the character described, the combination with a controlling-shaft, a coin-receiver and a spring-actuated lever which is tilted by the insertion of a coin, of a barrel having a slot through which the coin is expelled, an adjustable face-plate having a coin-slot and a lug which stops the movement of the coin-receiver when in alinement with the slot, substantially as shown, for the purpose set forth.

40. In a device of the character described, the combination with casing B the circular angle-plate and the face-plate detachably secured thereto and provided with a coin-slot, of the controlling-shaft, the coin-receiver, the connecting-lever and the barrel, substantially as shown, for the purpose specified.

41. In a device of the character described, the combination with casing B, the angle-plate provided with a scale, and the face-plate detachably secured to the angle-plate and having a coin-slot and a mark corresponding with the scale, of the controlling-shaft, the coin-receiver, the connecting-lever, a fixed barrel having a slot 12 through which coins are discharged from the coin-receiver and means for varying the receiving position of the coin-receiver.

42. In a device of the character described, the combination with the controlling-shaft, the coin-receiver, the connecting-lever and the barrel, of the face-plate having a coin-slot and mark 23 on its outer side and a lug 42 on its inner side which is engaged by the coin-receiver, the angle-plate having a scale with which the mark is adapted to register, and means for adjustably securing the face-plate to the angle-plate so that the position of lug 42 may be changed to increase or decrease the movement of the coin-receiver.

In testimony whereof we affix our signatures in presence of two witnesses.

CHARLES P. MAYER.
JOHN H. POMEROY.

Witnesses:
EMERSON R. SMITH,
THOMAS H. SAVARD.